(12) United States Patent
Lab

(10) Patent No.: US 10,939,612 B2
(45) Date of Patent: Mar. 9, 2021

(54) WEED WACKER

(71) Applicant: Anthony Lab, Barberton, OH (US)

(72) Inventor: Anthony Lab, Barberton, OH (US)

(*) Notice: Subject to any disclaimer, the term of this patent is extended or adjusted under 35 U.S.C. 154(b) by 79 days.

(21) Appl. No.: 16/392,777

(22) Filed: Apr. 24, 2019

(65) Prior Publication Data

US 2020/0337228 A1 Oct. 29, 2020

(51) Int. Cl.
*A01D 34/416* (2006.01)
*A01D 34/90* (2006.01)

(52) U.S. Cl.
CPC ........... *A01D 34/416* (2013.01); *A01D 34/90* (2013.01)

(58) Field of Classification Search
CPC .................... A01D 34/416–4168; A01D 34/90
See application file for complete search history.

(56) References Cited

U.S. PATENT DOCUMENTS

| | | | | |
|---|---|---|---|---|
| 4,207,675 A * | 6/1980 | Causey | ................ | A01G 3/08 30/296.1 |
| 4,505,040 A * | 3/1985 | Everts | ................ | A01D 34/416 172/41 |
| 5,115,536 A * | 5/1992 | Jarvis | ................ | B25G 3/38 15/144.1 |
| 5,261,162 A * | 11/1993 | Siegler | ................ | A01G 3/053 30/216 |
| 5,996,162 A * | 12/1999 | Hsu | ................ | B25G 1/04 15/144.1 |
| 6,260,278 B1 * | 7/2001 | Faher | ................ | A01D 34/902 172/41 |
| 6,382,058 B1 * | 5/2002 | Owoc | ................ | B25G 1/007 81/177.8 |
| 6,516,598 B1 * | 2/2003 | Notaras | ................ | A01D 34/001 172/17 |
| 8,186,066 B2 * | 5/2012 | Doragrip | ................ | A01G 3/053 30/296.1 |
| 8,381,344 B1 * | 2/2013 | Bergman | ................ | A46B 13/02 15/1.7 |
| 10,375,896 B2 * | 8/2019 | Sheffer | ................ | A01G 3/053 |
| 2010/0126029 A1 * | 5/2010 | Peterson | ................ | A01D 34/90 30/519 |
| 2010/0223897 A1 * | 9/2010 | Mills | ................ | A01D 34/416 56/12.7 |
| 2010/0229315 A1 * | 9/2010 | Rosenzweig | ................ | B25G 3/38 15/144.1 |
| 2011/0079113 A1 * | 4/2011 | Johnson | ................ | B25G 3/38 81/60 |
| 2013/0248216 A1 * | 9/2013 | Tsuchiya | ................ | A01G 3/053 173/18 |

* cited by examiner

*Primary Examiner* — Kenneth E Peterson
(74) *Attorney, Agent, or Firm* — Daniel M. Cohn; Howard M. Cohn

(57) ABSTRACT

A mono-filament whip type weed cutter incorporating a pivotable shaft that enables the weed cutter to reach otherwise inaccessible weeds. The mono-filament whip type weed cutter includes two interconnected first and second trimmer support shafts. A rotating wheel connected to one end of the pivotable shaft. A power source is connected to an opposite end of the pivotable shaft. A hinge joint including a sprocket is disposed between and interconnecting the first and second trimmer support shafts. A gear lock bar secures the sprocket in place to position the first and second trimmer support shafts with respect to each other.

1 Claim, 5 Drawing Sheets

WEED WACKER

FIELD OF INVENTION

The present invention relates generally to weed wacker and, more specifically, the present invention relates to a weed wacker with a hinged support shaft or handle that allows a rotating reel to be positioned in otherwise inaccessible locations.

BACKGROUND OF INVENTION

As is known, lawn and/or yard trimming equipment of the mono-filament type, commonly marketed as "weed wackers", are in widespread use. An objectionable feature inherent with such equipment, however, is the difficulty of reaching weeds which are difficult to reach such as those under bushes or lawn furniture. The equipment is subject to being damaged when brought into too close proximity to trees, shrubs and the like causing them damage and where the mono-filament can be damaged as a result of striking such surfaces such as the bottom of the furniture or the underside of a bush or tree. The improved invention overcomes the preceding difficulties by providing an attachment that is secured to a support shaft or handle for allowing a rotating mono-filament type trimmer to be positioned in such a way so as to allow the mono-filament cutter to reach otherwise inaccessible weeds and the like located under bushes or lawn furniture.

SUMMARY OF THE INVENTION

According to an embodiment of the present invention, there is disclosed a mono-filament whip type weed cutter incorporating a pivotable shaft that enables the weed cutter to reach otherwise inaccessible weeds. The mono-filament whip type weed cutter includes two interconnected first and second trimmer support shafts. A rotating wheel connected to one end of the pivotable shaft. A power source is connected to an opposite end of the pivotable shaft. A hinge joint including a sprocket is disposed between and interconnecting the first and second trimmer support shafts. A gear lock bar secures the sprocket in place to position the first and second trimmer support shafts with respect to each other.

According to a further embodiment of the present invention, there is disclosed a mono-filament whip type weed cutter incorporating a pivotable shaft that enables the weed cutter to reach otherwise inaccessible weeds. The mono-filament whip type weed cutter includes two interconnected first and second trimmer support shafts. A rotating wheel includes a cutter, connected to one end of the pivotable shaft. A power source including a rotating cable connected to an opposite end of the pivotable shaft. A hinge joint is disposed between and interconnecting the first and second trimmer support shafts. A sprocket has gear teeth, pivotably mounted to the hinge joint. A gear lock bar for securing the sprocket in place to position the first and second trimmer support shafts with respect to each other.

BRIEF DESCRIPTION OF THE DRAWINGS

The structure, operation, and advantages of the present invention will become further apparent upon consideration of the following description taken in conjunction with the accompanying figures (Figures). The figures are intended to be illustrative, not limiting.

Certain elements in some of the figures may be omitted, or illustrated not-to-scale, for illustrative clarity. The cross-sectional views may be in the form of slices, or near-sighted cross-sectional views, omitting certain background lines which would otherwise be visible in a true cross-sectional view, for illustrative clarity.

Often, similar elements may be referred to by similar numbers in various figures (Figures) of the drawing, in which case typically the last two significant digits may be the same, the most significant digit being the number of the drawing figure (Figure).

FIG. 1 is a front, three-dimensional view of the improved weed wacker in use, in accordance with the present invention.

FIG. 2 is a front, three-dimensional view of the improved weed wacker, in accordance with the present invention.

FIG. 3 is a side, three-dimensional view of the improved weed wacker, in accordance with the present invention.

FIG. 4 is a side, three-dimensional view of the hinge joint of the improved weed wacker, in accordance with the present invention.

FIG. 5 is a side view of the improved weed wacker in two different positions, in accordance with the present invention.

DETAILED DESCRIPTION OF THE PREFERRED EMBODIMENT

Figure 1:
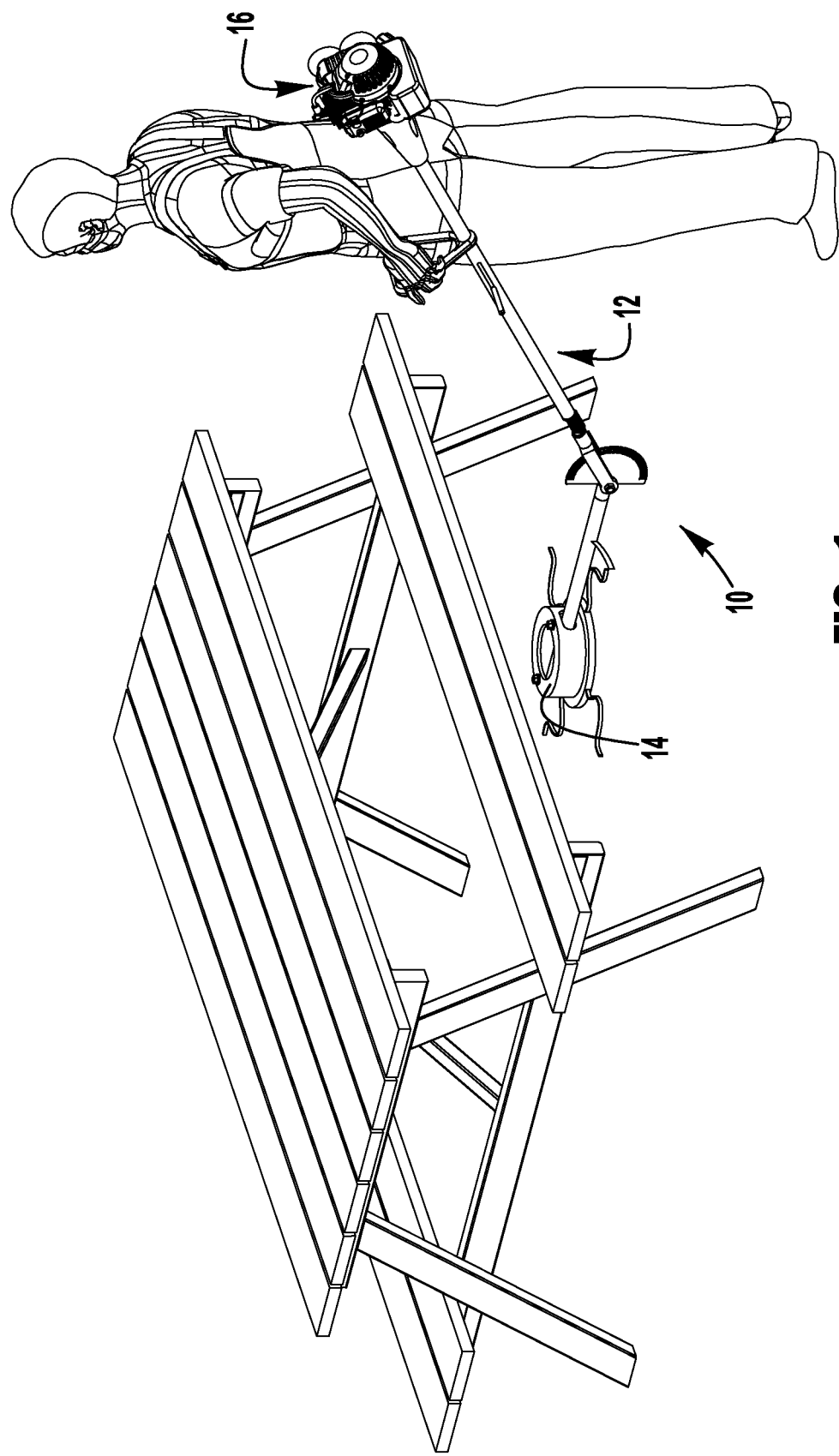

In the description that follows, numerous details are set forth in order to provide a thorough understanding of the present invention. It will be appreciated by those skilled in the art that variations of these specific details are possible while still achieving the results of the present invention. Well-known processing steps are generally not described in detail in order to avoid unnecessarily obfuscating the description of the present invention.

In the description that follows, exemplary dimensions may be presented for an illustrative embodiment of the invention. The dimensions should not be interpreted as limiting. They are included to provide a sense of proportion. Generally speaking, it is the relationship between various elements, where they are located, their contrasting compositions, and sometimes their relative sizes that is of significance.

In the drawings accompanying the description that follows, often both reference numerals and legends (labels, text descriptions) will be used to identify elements. If legends are provided, they are intended merely as an aid to the reader and should not in any way be interpreted as limiting.

In general terms, the present invention relates to a mono-filament whip type weed cutter 10 incorporating a pivotable shaft 12 that enables the weed cutter to reach otherwise inaccessible weeds and the like located, for example under bushes or lawn furniture, as shown in FIG. 1.

The whip type weed cutter 10, also known as a string trimmer, includes a pivotable shaft 12 constructed of two interconnected first and second trimmer support shafts 12a and 12b. One end of the shaft 12 is connected to a cutting head or rotating reel 14 and the opposite end of the shaft can be interconnected with a power source 16, such as a gasoline motor, batteries or an electric wire.

Figure 3:
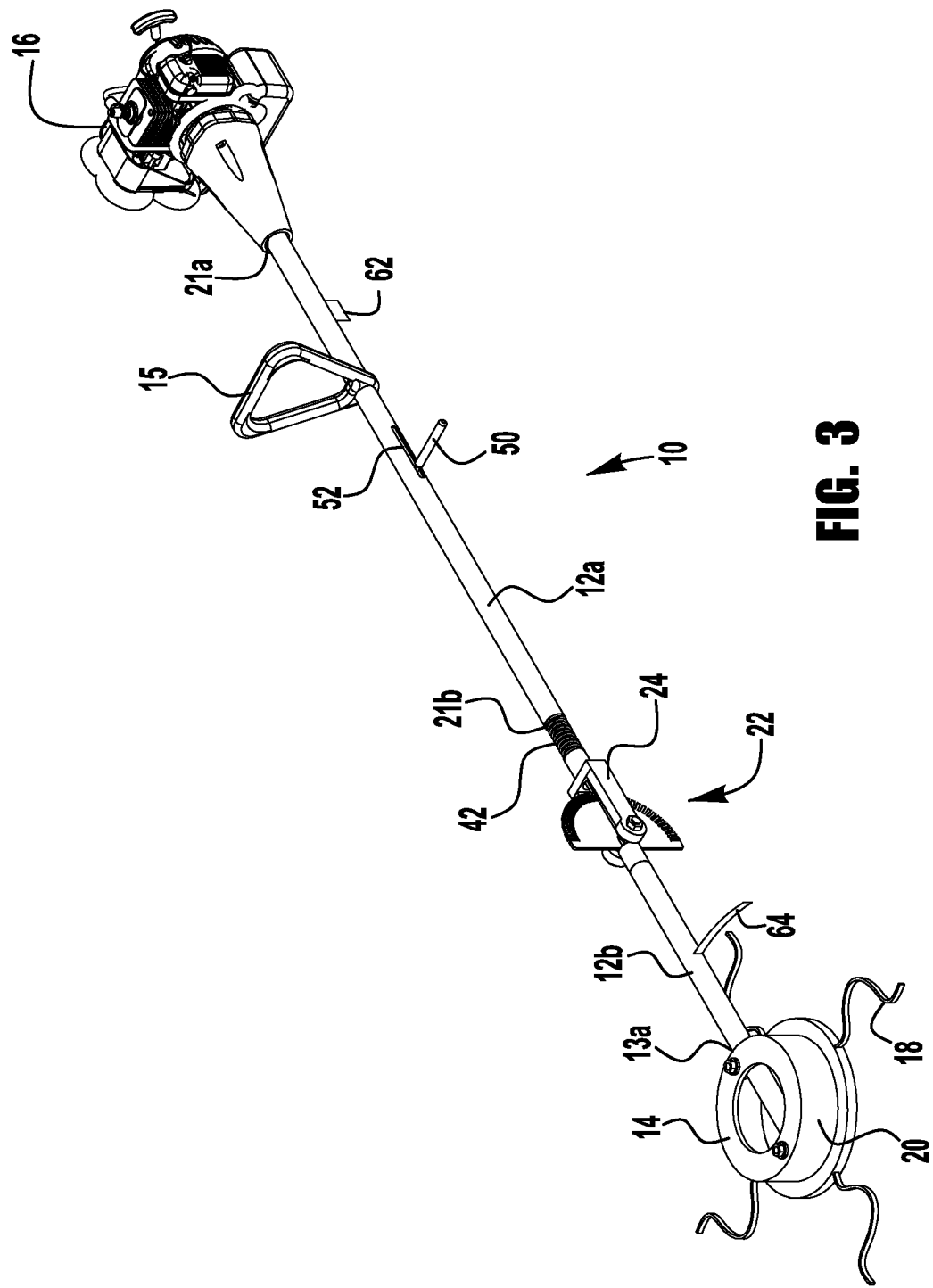
Figure 4:
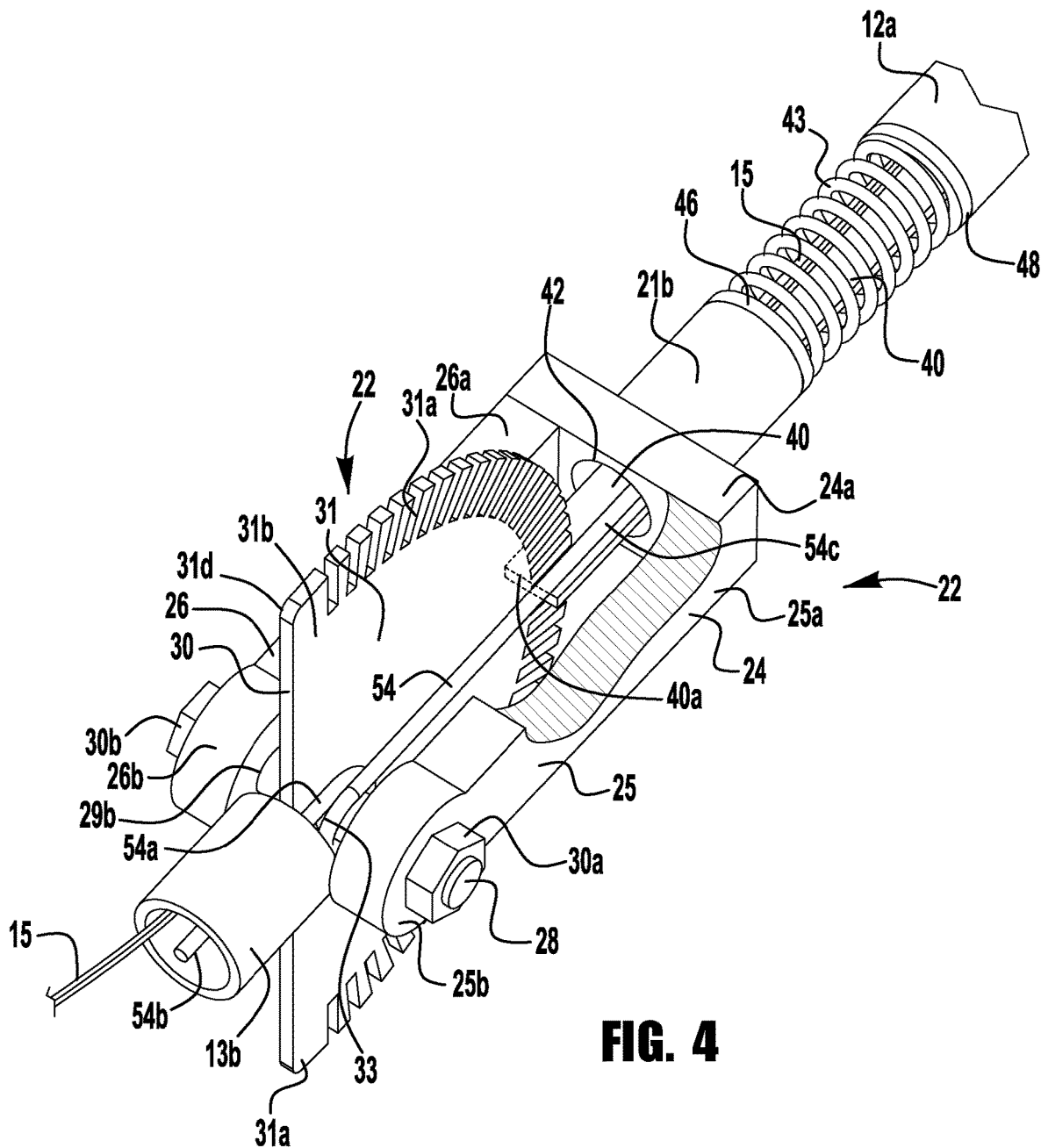
Figure 5:
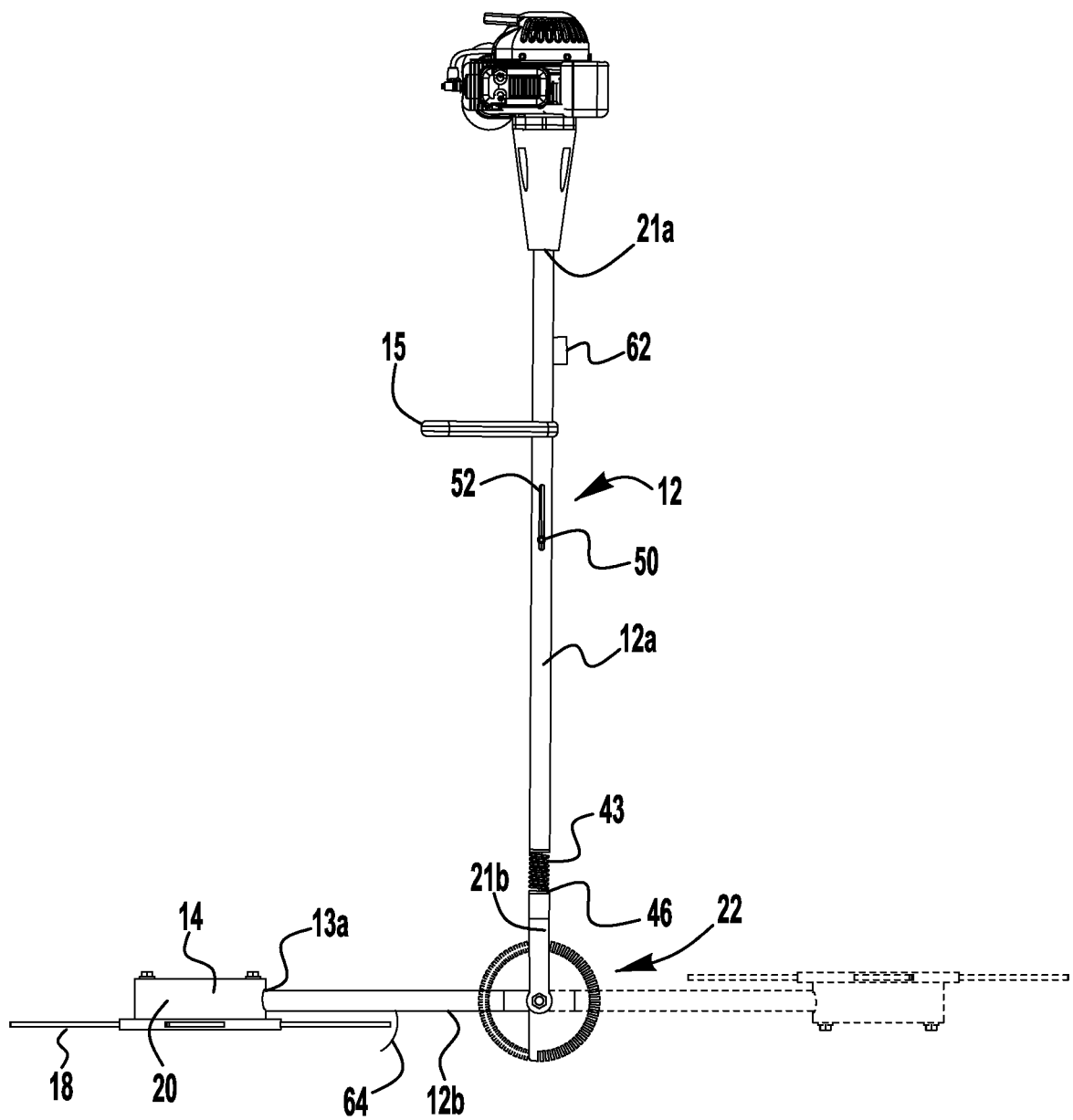

As shown in FIGS. 3 and 4, the rotating reel 14 which is powered by a gasoline motor 16 mounted to one end of a shaft 12a. The gasoline motor 16 powers the rotating reel 14 with a rotating cable 15 that is mounted at one end to the power source 16 and at the opposite end to the rotating reel 14. The rotating cable 15 can extend through the hollow first trimmer support shaft 12a, past the hinge joint 22 and through the hollow second trimmer support shaft 12b where it can be attached to the rotating reel 14. The rotation of the tuning cable 15 causes the rotating reel 14 to rotate. The string trimmer 10 works on the principle that when one or more lines 18, such as a circular cross-section nylon line, is held out from its housing (the rotating reel) 14 by centrifugal force when the housing is turned fast enough. The faster the rotating reel 14 turns, the stiffer the lines 18 become. Even a nylon line 18 with a circular cross section is able to cut grass, slightly woody plants and the like. Some monofilament lines 18 designed for more powerful cutters have an extruded shape, such as a star shaped cross-section that helps the line slash the material being cut. The lines 18 are thus able to cut quite large woody plants (small shrubs) or at least ring-bark very effectively.

As the rotating reel 14 turns, the lines 18 extend horizontally outward from the reel and spin around while the operator swings the trimmer 10 about the plants to be trimmed. The operator controls the height of the reel 14 at which the cutting takes place with a handle 15 secured to the shaft 12 and can manipulate the shaft 12 to position the reel needs so as to trim down to ground level quite easily.

Figure 2:
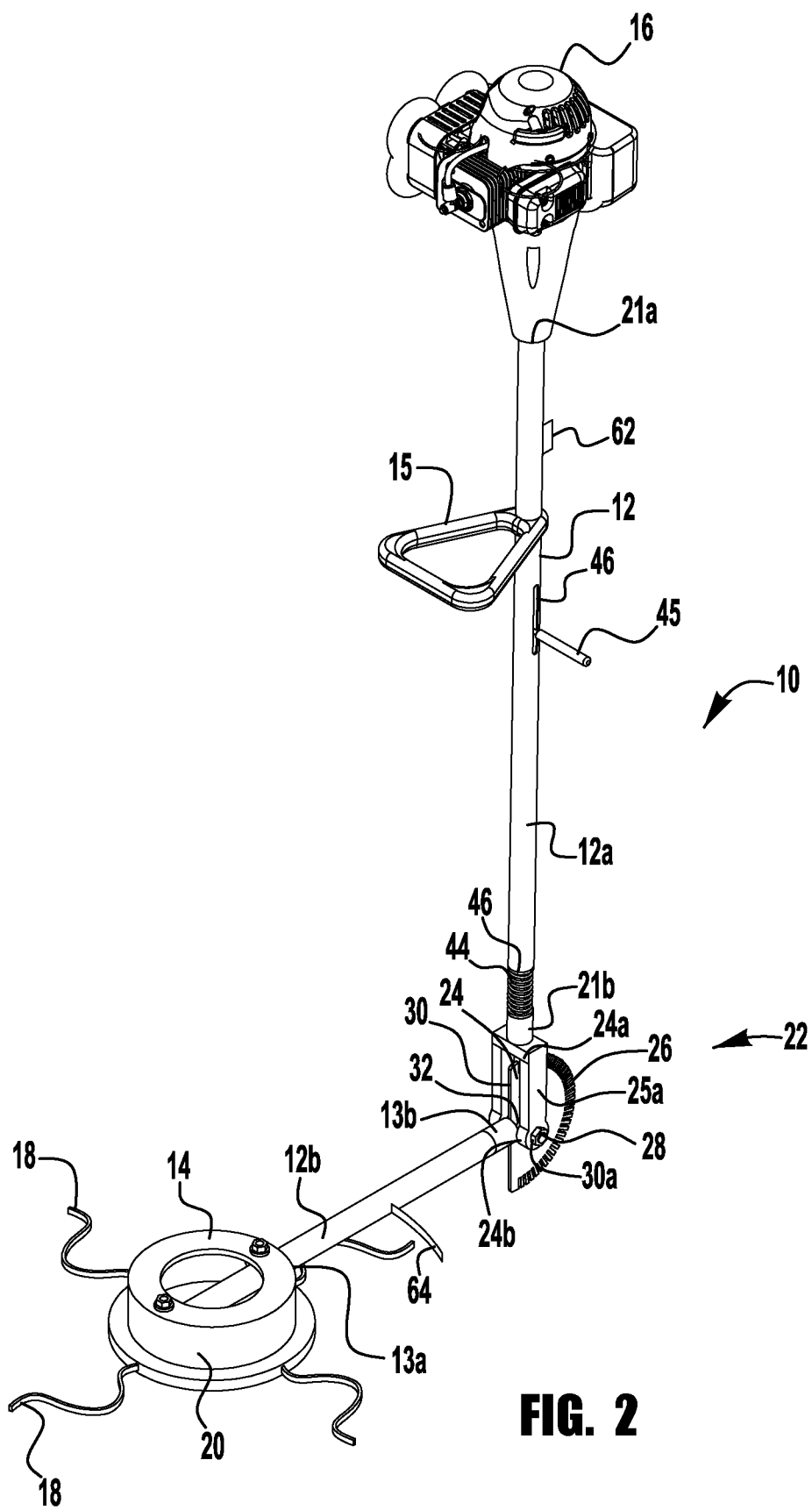

Referring to FIGS. 2 and 3, the rotating reel 14 is shown mounted to one end 13a of a second trimmer support shaft 12b and includes a cutter in the form of a plurality of rotatable mono filaments 18 used for lawn trimming. The second trimmer support shaft 12b is mounted at a free end 13a thereof to the casing 20 housing the rotating reel 14. A first trimmer support shaft 12a has the gasoline motor 16 secured at a first end 21a. The first trimmer support shaft 12a is mounted at a second end 21b to a hinge joint 22 disposed between and interconnecting the first and second trimmer support shafts 12a and 12b, respectively.

The hinge joint 22, as seen in FIG. 4, includes a generally u-shaped coupling 24 having the second end 21b of the first trimmer support shaft 12a mounted to a first end 24a of the coupling. The second end 24b of the coupling 24 has the free end 13b of the second support shaft 12b mounted thereto. The coupling 24 has two legs 25 and 26 secured at one end 25a and 26a, respectively, to the end 24a of coupling 24. The second ends 25b and 26b of the legs 25 and 26, respectively, are spaced from each other and each has a bore 29a (not shown) and 29b, respectively, therethrough. A bolt 28 can extend through the two bores and is mounted in place with nuts 30a and 30b. The bolt 28 can be rotatably received in the bores.

A sprocket also known as a toothed member 31 is disposed between the legs 25 and 26 and has a hole 33 extending through the center thereof. The sprocket 31 is secured by the bolt 28 so that the sprocket can partially rotate within the space between the first legs 25 and second legs 26.

The sprocket 31 has gear teeth 31a disposed about the edge 31b of about ½ of the circumference of the sprocket 31. The gear teeth 31a extend about 180 degrees about the circumference of the sprocket between the end sections 31c and 31d of the sprocket. The sprocket 24 is pivotably mounted to the generally u-shaped coupling 34.

The second end 13b of the second support shaft 12b is fixed between the outer ends 25b and 26b of the sprocket 31 by any desired means such as welding.

The first support shaft 12a is hollow and houses a flat, spring-loaded, gear lock bar 40 that extends outward from the second end 21b of the first support shaft 12a and through a bore 42 in the end 24a of coupling 24. One end 40a of the flat, spring-loaded, gear lock bar 40 is biased into the gear teeth 31a and towards the second end 21b of the first trimmer support shaft 12a.

A compression spring 43 is disposed about the lock bar 40 and extends between two circular end supports 46 and 48. The circular end support 46 is secured to the gear lock bar 40. The opposite end 40b of the gear lock bar 40 is attached to a handle 50 that projects out of a slot 52 that extends lengthwise along the support shaft 12a and is mounted to the gear lock bar 40 within the support shaft 12a. By pulling the handle 50 towards the end of the support shaft 12a upon which is mounted in the motor 16, the end 40a of the flat, spring-loaded, gear lock bar 40 is pulled out of contact with the gear teeth 31a so that the first and second support shafts 12a and 12b can be moved with respect to each other.

A helical torsion spring 54 is mounted with bolt 28 extending through the coil 54a of the helical torsion spring. A first end 54b of the helical torsion spring 54 is disposed in the opening of the end 13b and the opposite second end 54c of the spring is disposed in the second end 21b of the support shaft 12a. The helical torsion spring 54 exerts a torque so that when the lock bar 40a is withdrawn from between the teeth 31a, the first support shaft 12a is pressed downward, in the direction of the ground when the type weed cutter 10 is held as shown in FIG. 1.

Normally, the lock bar 40a is locked into place as shown, for example in FIGS. 2 and 3. When the horizontal gear lock bar 44 is pulled out from between the adjacent gear teeth by pulling the handle 50, the support shafts 12a and 12b can be moved into an angle with respect to each other, such as 90 degrees as shown in FIG. 2 or 180 degrees as shown in FIG. 3.

A power switch 62 can be provided on shaft 12 to start the motor 16 whereby the cable 15 rotates and turns the rotating reel 14.

A guard 64 can be disposed adjacent the rotating reel 14 so that cut grass, slight, woody plants and the like are prevented from being blown behind the weedwacker where the operator is standing.

As shown in FIG. 1, the whip type weed cutter 10, can be disposed so that the pivotable shaft 12 which carries the cutting head or rotating reel 14 can be positioned so that the rotating reel can reach otherwise inaccessible weeds and the like, for example under bushes or lawn furniture, as shown in FIG. 1. To change the relationship between the first and second shaft sections 12a and 12b, the horizontal gear lock bar 44 is pulled out from between the adjacent gear teeth 26 by pulling the handle 45 away from the hinge joint 22. This allows the torsion spring 54 to move the support shafts 12b with respect to support shaft 12a so as to change the angle between shafts 12a and 12b. Once the gear lock bar 44 is pulled out from between the adjacent gear teeth 26, the operator can leave the rotating reel on the ground and raise the shaft section 12a to change the angle between shafts 12a and 12b. Once the position of the two shafts 12a and 12b is at a desired angle, the handle 45 can be released so that the gear lock bar 44 is biased back into position between the adjacent gear teeth 26.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

The invention claimed is:

1. A mono-filament whip type weed cutter incorporating a pivotable shaft that enables the weed cutter to reach weeds, comprising:

the pivotable shaft constructed of two interconnected first and second trimmer support shafts;

a rotating reel connected to one end of the pivotable shaft;

a power source connected to an opposite end of the pivotable shaft;

a hinge joint including a toothed member disposed between and interconnecting the first and second trimmer support shafts;

a lock bar for securing the toothed member in place to position the first and second trimmer support shafts with respect to each other;

further including the power source having a rotating cable mounted at one end to the power source and at an opposite end to the rotating reel, whereby the rotating cable extends through the first trimmer support shaft, past the hinge joint, and through a hollow second trimmer support shaft;

wherein the rotating reel is mounted to one end of the second trimmer support shaft and includes a cutter in the form of a plurality of rotatable mono filaments extending outwardly from a periphery of the rotating reel;

further including the first trimmer support shaft being mounted at a second end to a hinge joint disposed between and interconnecting the first and second trimmer support shafts;

wherein the hinge joint includes:

a coupling having first and second legs, and having the second end of the first trimmer support shaft mounted to a first end of the coupling and the opposite end of the coupling having a second end of the second support shaft mounted thereto;

a compression spring disposed about the lock bar and extending between two circular end supports, and an opposite end of the lock bar attached to a handle to pull the lock bar out of contact with gear teeth so that the first and second support shafts can be moved with respect to each other; and wherein a helical torsion spring is mounted with a bolt extending through a coil of the helical torsion spring, whereby a first end of the helical torsion spring is disposed in an opening of the second end of the second support shaft, and an opposite second end of the helical torsion spring is disposed in the second end of the first support shaft.

* * * * *